United States Patent
Antonellis et al.

(10) Patent No.: US 9,653,119 B2
(45) Date of Patent: *May 16, 2017

(54) METHOD AND APPARATUS FOR GENERATING 3D AUDIO POSITIONING USING DYNAMICALLY OPTIMIZED AUDIO 3D SPACE PERCEPTION CUES

(71) Applicant: WARNER BROS. ENTERTAINMENT INC., Burbank, CA (US)

(72) Inventors: Darcy Antonellis, Granada Hill, CA (US); Massimiliano Gasparri, Los Angeles, CA (US); Lewis S. Ostrover, Los Angeles, CA (US); Bradley Thomas Collar, Valencia, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 414 days.

This patent is subject to a terminal disclaimer.

(21) Appl. No.: 14/303,963

(22) Filed: Jun. 13, 2014

(65) Prior Publication Data
US 2014/0308024 A1   Oct. 16, 2014

Related U.S. Application Data

(60) Division of application No. 13/231,153, filed on Sep. 13, 2011, now Pat. No. 8,755,432, and a
(Continued)

(51) Int. Cl.
*G11B 27/30* (2006.01)
*G10L 19/008* (2013.01)
(Continued)

(52) U.S. Cl.
CPC ........... *G11B 27/30* (2013.01); *G10L 19/008* (2013.01); *G11B 27/10* (2013.01); *H04N 9/87* (2013.01);
(Continued)

(58) Field of Classification Search
None
See application file for complete search history.

(56) References Cited

U.S. PATENT DOCUMENTS 5,530,478 A   6/1996 Sasaki et al.
5,684,714 A   11/1997 Yogeshwar et al.
(Continued)

FOREIGN PATENT DOCUMENTS

WO   2008/038205 A2   3/2008

OTHER PUBLICATIONS

Office Action issued in a continuation U.S. Appl. No. 13/205,720 on Jan. 2, 2013.
(Continued)

*Primary Examiner* — Sath V Perungavoor
*Assistant Examiner* — Janese Duley
(74) *Attorney, Agent, or Firm* — Gottlieb, Rackman & Reisman, P.C.

(57) ABSTRACT

An apparatus generating audio cues for content indicative of the position of audio objects within the content comprising:
an audio processor receiving raw audio tracks for said content and information indicative of the positions of at least some of said audio tracks within frames of said content, said audio processor generating corresponding audio parameters;
an authoring tool receiving said audio parameters and generating encoding coefficients, said audio parameters including audio cue of the position of audio objects corresponding to said tracks in at least one spatial dimension; and
a first audio/video encoder receiving an input and encoding said input into an audio visual content having visual objects and audio objects, said audio objects being
(Continued)

disposed at location corresponding to said one spatial position, said encoder using said encoding coefficients for said encoding.

15 Claims, 5 Drawing Sheets

Related U.S. Application Data continuation-in-part of application No. 13/173,671, filed on Jun. 30, 2011, now Pat. No. 8,917,774.

(60) Provisional application No. 61/382,204, filed on Sep. 13, 2010, provisional application No. 61/360,088, filed on Jun. 30, 2010.

(51) Int. Cl.
- *G11B 27/10* (2006.01)
- *H04N 9/87* (2006.01)
- *H04N 19/597* (2014.01)
- *G10L 19/20* (2013.01)
- *G11B 20/10* (2006.01)

(52) U.S. Cl.
CPC ........... *H04N 19/597* (2014.11); *G10L 19/20* (2013.01); *G11B 2020/10555* (2013.01); *G11B 2020/10592* (2013.01)

(56) References Cited

U.S. PATENT DOCUMENTS

| | | | |
|---|---|---|---|
| 6,572,475 B1 * | 6/2003 | Okabe | A63F 13/10 463/30 |
| 8,290,338 B2 | 10/2012 | Sasaki et al. | |
| 8,306,387 B2 | 11/2012 | Yamashita et al. | |
| 8,363,729 B1 | 1/2013 | Sha et al. | |
| 2003/0012275 A1 | 1/2003 | Boice et al. | |
| 2003/0184453 A1 | 10/2003 | Hall et al. | |
| 2004/0054721 A1 | 3/2004 | Pilu et al. | |
| 2005/0146521 A1 | 7/2005 | Kayle et al. | |
| 2005/0160473 A1 | 7/2005 | Gal-Oz | |
| 2006/0072399 A1 * | 4/2006 | Fujimoto | G11B 27/034 369/47.1 |
| 2006/0115092 A1 | 6/2006 | Toyama et al. | |
| 2006/0129909 A1 | 6/2006 | Butt et al. | |
| 2006/0210182 A1 | 9/2006 | Kimura | |
| 2007/0230565 A1 | 10/2007 | Tourapis et al. | |
| 2008/0025391 A1 | 1/2008 | Amon et al. | |
| 2008/0123754 A1 | 5/2008 | Ratakonda et al. | |
| 2008/0242946 A1 | 10/2008 | Krachman | |
| 2009/0177479 A1 * | 7/2009 | Yoon | G10L 19/008 704/500 |
| 2009/0232207 A1 | 9/2009 | Chen | |
| 2009/0315980 A1 | 12/2009 | Jung et al. | |
| 2010/0023634 A1 | 1/2010 | Labonte et al. | |
| 2010/0076577 A1 * | 3/2010 | Lee | G10L 19/008 700/94 |
| 2010/0092099 A1 | 4/2010 | Richter | |
| 2010/0174541 A1 | 7/2010 | Vos | |
| 2010/0195723 A1 | 8/2010 | Ikai et al. | |
| 2010/0238267 A1 | 9/2010 | Izzat et al. | |
| 2010/0309975 A1 | 12/2010 | Zhoi et al. | |
| 2011/0119708 A1 | 5/2011 | Lee et al. | |
| 2011/0200266 A1 | 8/2011 | Fuchie et al. | |
| 2012/0062700 A1 | 3/2012 | Antonellis et al. | |

OTHER PUBLICATIONS

"High Quality 3D on Blu-ray is Here . . . ", Technicolor.com., the date of publication is not available. Admitted prior art.

"KDDI Labs demos 3D Virtual Sound Technology", Diginfo.tv, AkihabaraNews Official Partner, the date of publication is not available. Admitted prior art.

* cited by examiner

METHOD AND APPARATUS FOR GENERATING 3D AUDIO POSITIONING USING DYNAMICALLY OPTIMIZED AUDIO 3D SPACE PERCEPTION CUES

RELATED APPLICATIONS

This application claims priority to U.S. provisional application Ser. No. 61/382,204 filed Sep. 13, 2010. This application is a continuation-in-part of U.S. application Ser. No. 13/173,671 filed on Jun. 30, 2011, entitled METHOD AND APPARATUS FOR GENERATING ENCODED CONTENT USING DYNAMICALLY OPTIMIZED CONVERSION and claiming priority to U.S. Provisional patent application Ser. No. 61/360,088 filed on Jun. 30, 2010, all applications being incorporated herein by reference in their entirety.

BACKGROUND OF THE INVENTION

A. Field of Invention

This invention pertains to a method and apparatus of enhancing a 3D movie by using 3D space information associated with at least some of the characters/objects that are either part of the scene or off scene to position associated audio objects in 3D space.

B. Description of the Prior Art

In the past, 3D movie or episodic visual content was prepared for analog film distribution or other relatively low fidelity analog or digital transmission, storage, projection and/or display 3D formats, e.g. anaglyph. Advances in 3D encoding formats, presentation technology, and digital signal processing have resulted in 3D movie or episodic visual content produced or post-produced on film or video, converted to digital formats where necessary, and then transmitted, projected and/or displayed digitally in higher quality 3D formats, e.g., stereoscopic HD 1920×1080p 3D Blu-ray Disc. In the present application, the term 'digital 3D movie' is used to refer to a 3D movie, episodic, or other 3D audiovisual content recorded, produced and/or converted into a digital format. This also includes content produced in 2D and then post-produced from 2D to 3D, as well as rendered from 3D animation systems.

The formats for the audio component of digital 3D movies can vary in terms of production, encoding, transmission and/or presentation. Typical presentation formats for the audio component may vary from mono to stereo to multi-channel such as 5.1, 6.1 or 7.1. Some of these audio formats include audio cues for depth perception such as amplitude differences, phase differences, arrival time differences, reverberant vs. direct sound source level ratios, tonal balance shifts, masking, and/or surround or multi-channel directionality. These cues can be tailored to enhance the presentation of a digital 3D movie so that audio 3D space perception complements the visual 3D space perception. In this manner, a digital 3D movie looks and 'feels' more realistic if the 3D position of a visual object of interest and associated audio are coincident.

When a digital 3D movie is prepared for distribution in some format or distribution channel, there may be relevant 3D visual information determined by analysis software and/or by an operator on a frame by frame, group of frames, or scene by scene basis and recorded in a respective log.

The conventional method of representing 3D depth information is via a z-axis depth map, which consists of a single 2-dimensional image that has the same spatial resolution as the 3D imagery (e.g. 1920×1080 for HD video). Each pixel of the image contains a gray-scale value corresponding to the depth of that particular pixel in the scene. For example, for an 8-bit data representation a gray-scale value of 256 (pure white) could represent the maximum positive 3D parallax (into the screen)|, while a value of 0 (pure black) could represent the maximum negative parallax (out of the screen). The values can then be normalized based on the depth budget of the scene, e.g. a value of 256 could represent a pixel that is 100 feet away from the viewer whereas a value of 0 could represent a pixel which is 10 feet away from the viewer.

Another possible data representation of 3D depth information is a 3-dimensional depth volume, whereby each pixel in the 3D volume of the scene is represented by a particular value. Unlike the z-axis depth map the 3D depth volume is not limited to a single gray-scale value, and instead for each pixel both the color value (i.e. RGB value) of that particular pixel as well as the x-y-z coordinate of that pixel can be represented. Computer generated 3D imagery or other 3D visual effects techniques may more easily lend themselves to creating 3D depth volumes versus utilizing a 2D z-axis depth map. Such 3D representations of the depth information could be used for future display systems including holographic projection. Other data representations can be used to represent the depth information in a given scene including, but not limited to, 2D disparity maps and eigenvectors.

A 3D space map of whole frames' visual content, or of objects of interest within frames, may be determined when preparing to position subtitles or other graphics in 3D space over the background video.

Some objects of audio interest could have on-screen visual counterparts that can be tracked spatially. For example, as an on-screen actor moves and speaks in a scene, his position can be tracked both audially and visually. For example, there are visual object-tracking software systems and software development kits (such as the SentiSight 3.0 kit of Neurotechnology, Vilnius, Latvia,) that can detect and recognize visual objects within a scene and identify their specific locations. Such systems can tolerate in-plane rotation, some out-of-plane rotation, and a wide range of changes in scale. Such systems can also manage to track visual or audio objects that are occluded (e.g., as much as 50%). If motion vectors were to be used to plot the trajectory of objects that are either occluded to a greater degree, or even fully occluded visually, then object tracking could also identify locations of off-screen objects given sufficient, prior on-screen information. Other objects of audio interest, e.g., an actor speaking while off screen, or an actor speaking while being partially or fully occluded visually, may not be tracked. In this latter case, an on-screen actor might look directly across and past the screen plane boundary at another off-screen actor with whom he converses. Other audio objects of interest may not correspond to on screen visual objects at all depending upon positioning or editorial intent, e.g., an off-screen narrator's voice may be essential to a presentation, but there may be no on-screen item that corresponds to that voice.

However, in some instances during the preparation of a digital 3D movie its audio component may not include clear 3D space perception cues, either because these cues have been stripped away or because they were missing in the first place. This problem is compounded in real-time applications and environments such as video game rendering and live event broadcasting.

Just as there is a need to provide the audio component with cues for 3D space perception to enhance a digital 3D movie presentation, there is also a need to include such cues in the audio components of digital 3D movies in other formats. However, presently the preparation of digital 3D movies for release in one format does not include an efficient conversion of the audio component that insures the presence or preservation of the 3D space perception audio cues.

Therefore, an efficient scheme to optimize digital 3D movie preparation with audio 3D space perception cues is required. In addition, an efficient scheme to optimize additional digital 3D movie conversion with audio 3D space perception cues for other formats or distribution formats is required. In both cases, information gathered in digital 3D movie analysis is used as input to produce audio 3D space perception cues to enhance the 3D audiovisual experience.

Another problem arises in that currently a separate 2D version of the audio component, without 3D space perception cues, must be distributed for viewing of the content in 2D if the otherwise digital 3D movie is to be viewed in 2D, e.g. if there is no 3D display system available. Therefore, the data created in the course of encoding the audio 3D space perception cues can be saved and included with the digital 3D movie release file so that 3D-to-2D down-mixing can be managed downstream.

SUMMARY OF THE INVENTION

A system is provided in which content including visual objects and raw audio tracks are converted into a predetermined 2D or 3D format using an audio/video encoder. An audio processor receives the raw audio tracks and other information indicative of the position of at least some of the audio tracks in 1, 2 or 3 dimensions for each frame, or group of frames. Optionally, visual objects are associated with the audio tracks. Alternatively, if a track is not associated with a visual track in any particular frame, an audio object is defined spatially that is independent of any visual object.

An authoring tool is used to generate encoding coefficients based on the audio parameters, as well as other information, related, for example to the visual objects.

The audio/video encoder receives the input content and converts it into an encoded content in the desired format using a set of coefficients that may include some preset coefficients and some of the coefficients from the authoring tool.

In one embodiment, the audio/video encoder receives and converts original content.

In another embodiment, an original content has been converted using another encoder earlier, for example in a converted 2D or 3D content using a converter with a set of conversion coefficients and generating a log recording various parameters. During the later conversion, the first converted 3D content may be converted into the newly encoded content and some of the parameters stored in the log associated with the other converter and/or parameters (such as 3D tracking map of visual objects) is used.

In other words, preferably, two tracking maps are used in the present invention: a visual 3D tracking map tracking visual objects and an audio 3D tracking map tracking audio objects. In some instances, the two are coincident and sometimes the two vary either physically, or editorially. In case of divergence, manual controls from an operator and/or a systematic comparator based on some on-screen (or manually input off screen) object of interest coordinates the positions of the audio and visual objects. If necessary, the trajectory and motion vector calculation is performed to determine the motion and trajectory of audio objects of interest, if possible.

In other instances, for example, if the objects of interest tracking maps clearly show (since the visual objects are on screen throughout) where the objects are, and if the aural map diverges for some object(s) in a way that can be predicted using prior positioning and motion vectors, then the system can still function without manual override. If the audio tracking map diverges from the visual one in some non-linear and otherwise difficult to predict way-imagine video sprites popping in and out of existence every which way in a video game, except in some instances the 'sprites' are invisible and all we have is their aural presence, not a visual representation-then manual override is used to map the position of these audio instances.

DETAILED DESCRIPTION OF THE PREFERRED EMBODIMENT

Figure 1:
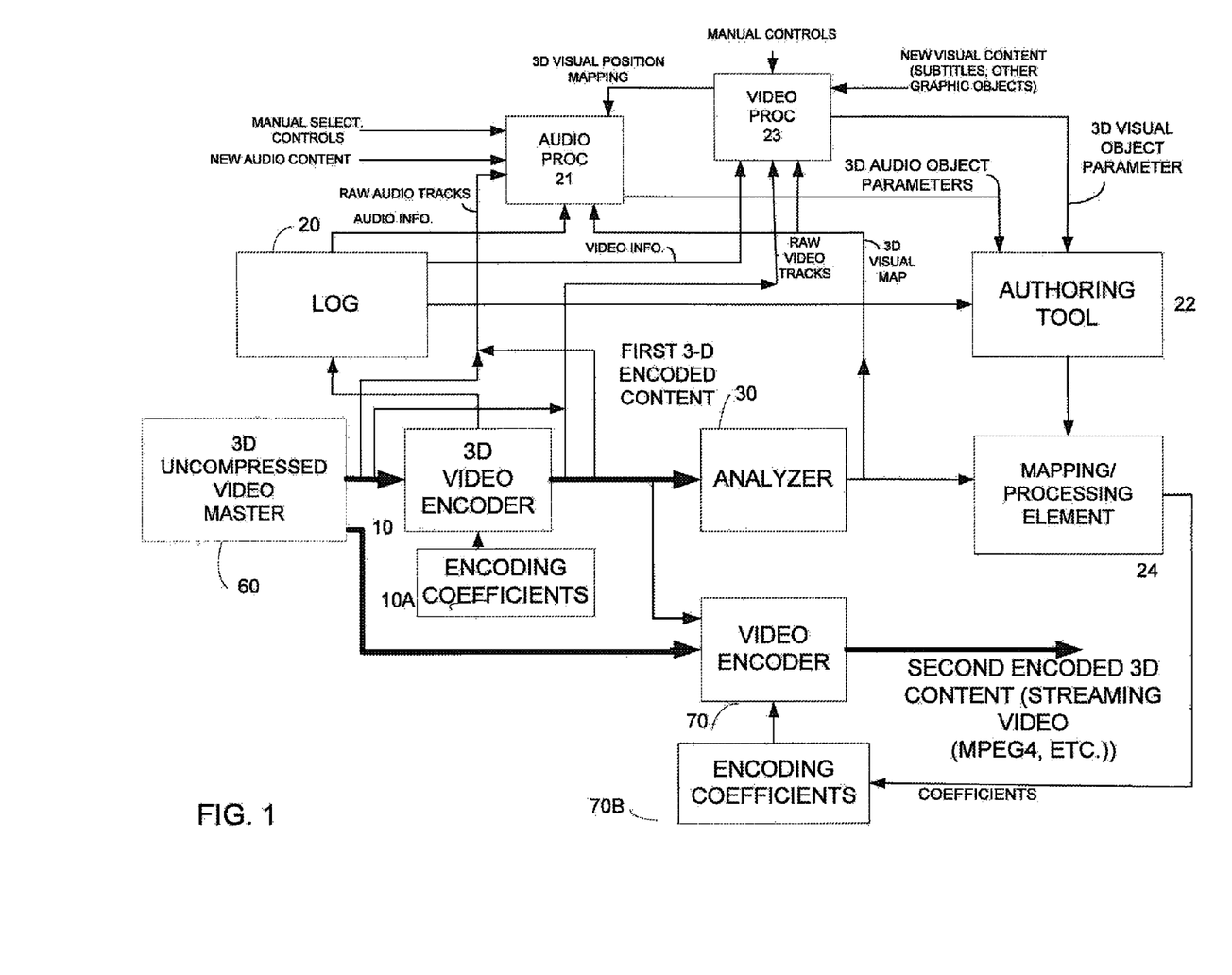
FIG. 1 shows a block diagram of an apparatus constructed in accordance with this invention.

The present invention provides a solution for the above-described problems. FIG. 1 shows the components of an apparatus for practicing the invention. An uncompressed digital 3D movie 60 is analyzed and encoded by a first 3D audio/video encoder 10 using a first set of encoding coefficients 10A. For example, the digital 3D movie could be a sequence of 3D frame at the same native resolution as the source material (e.g., 1920×1080p). Each 3D frame is defined by a left-eye and a right-eye image. The output of the encoder 10 is referred to as a first 3D encoded content.

The 3D movie could be a feature movie shot with live actors, or could be a cartoon with virtual characters. Moreover, the 'movie' could include a straight sequence of scenes, or could be an interactive game in which various scenes are played in sequences determined by viewer actions.

Typically, in each 3D frame, planes and/or objects of visual interest correspond to audio objects of interest. For example, in one instance an on-screen actor can be speaking a main dialog. In this case, the audio object of interest—the main dialog and the actor have the 3D spatial location. In another case, audio objects of interest may not correspond to visual objects of interest. For example, a narrator or commentator who is on- or off-screen can provide editorial dialog of a car race. The various cars in the race can emerge rapidly from the background, roar closer and closer, and then zoom past the viewer off screen. In this case, the visual objects of interest are the cars and there are two sets of audio objects of interest: the editorial dialog and the sound of the zooming cars. In this case, to make the scene look and feel dramatic, both the sounds of the racing cars and the editorial dialog should be provided as audio objects of interest. During the scene, the car sounds (e.g., the audio objects) and visual images (e.g., the visual objects) move closer and closer to the viewer but do not mask the editorial dialog. In another case, for example, in a video game, visual objects may pop in and out of the scene in a pseudorandom manner and various sound effects may be associated with some of these objects, or randomly spaced audio objects may be produced.

As discussed above, 3D content may include a Z-axis depth map indicating relative distance of various visual objects (or planes of interest) for the respective 3D frames. Conventionally, a 3D Z-axis depth map consists of a two dimensional image having the general outline and surface characteristics of all the objects of interest. Objects, and object surfaces, at various locations along the Z-axis are represented on the two dimensional image by their respective outlines and surface shadings. Each outline includes one or more surfaces, the surfaces being shaded. More particularly, each outline and each surface of the outline (if more than one) is shaded on a gray scale corresponding to the relative position of the respective objects and their surfaces. Thus, a 3D Z-axis depth map provides information about the relative positions of various objects of interest, and their surfaces, with respect to each other and with respect to a particular reference point such as the screen and/or the viewer. Of course, as discussed above, other means of indicating the positions of audio or visual objects in 3D space may be used and this invention is not limited to any one of these means.

Referring now to FIG. 1, in the system in accordance with this invention an encoder 10 receives a 3D movie, for example in the form of an uncompressed video master 60. The audio/video encoder 10 generates from this master a first 3D encoded content which may be stored, recorded or distributed to customers via various distribution channels. The first 3D encoded content does not have information providing audio 3D space perception cues relative to the 3D space visual objects, or any other audio objects of interest.

The apparatus further includes an audio processor 21, a video processor 23 and an authoring tool 22.

The video processor received a 3D video tracking map such as a 3D Z-axis map described above that tracks the positions of visual objects of interest for each frame or groups of frames for encoded content. The 3D tracking map can be derived from the log 20, or by analyzing the first 3D encoded content using analyzer 30. In addition, the video processor 23 may also receive manual controls for controlling the positions of some of the visual objects. Furthermore, new visual content may be provided to the video processor. This new content may include subtitles and/or other additional graphic elements (as described more fully in commonly assigned co-pending application Ser. No. 13/205,720 filed Aug. 9, 2011, entitled METHOD AND APPARATUS FOR GENERATING ENCODED CONTENT USING DYNAMICALLY OPTIMIZED CONVERSTION FOR 3D MOVIES). The visual processor generates visual parameters that are provided to the authoring tool 22.

The audio processor 21 receives the raw audio signals (e.g., the audio tracks from the uncompressed video master) and/or other sources. For example, additional audio content may be added that was not in the original uncompressed video master. The audio processor 21 receives other information, such as the 3D position of various visual objects, manual and/or automated selection signals correlating certain audio tracks with either visual objects or defining audio objects (if the audio tracks either are not associated with a visual object, or are associated with an off-scene visual objects). The audio processor 21 then generates audio parameters indicative of the position of the audio content, such as audio objects of interest in the relevant frames.

Figure 1A:
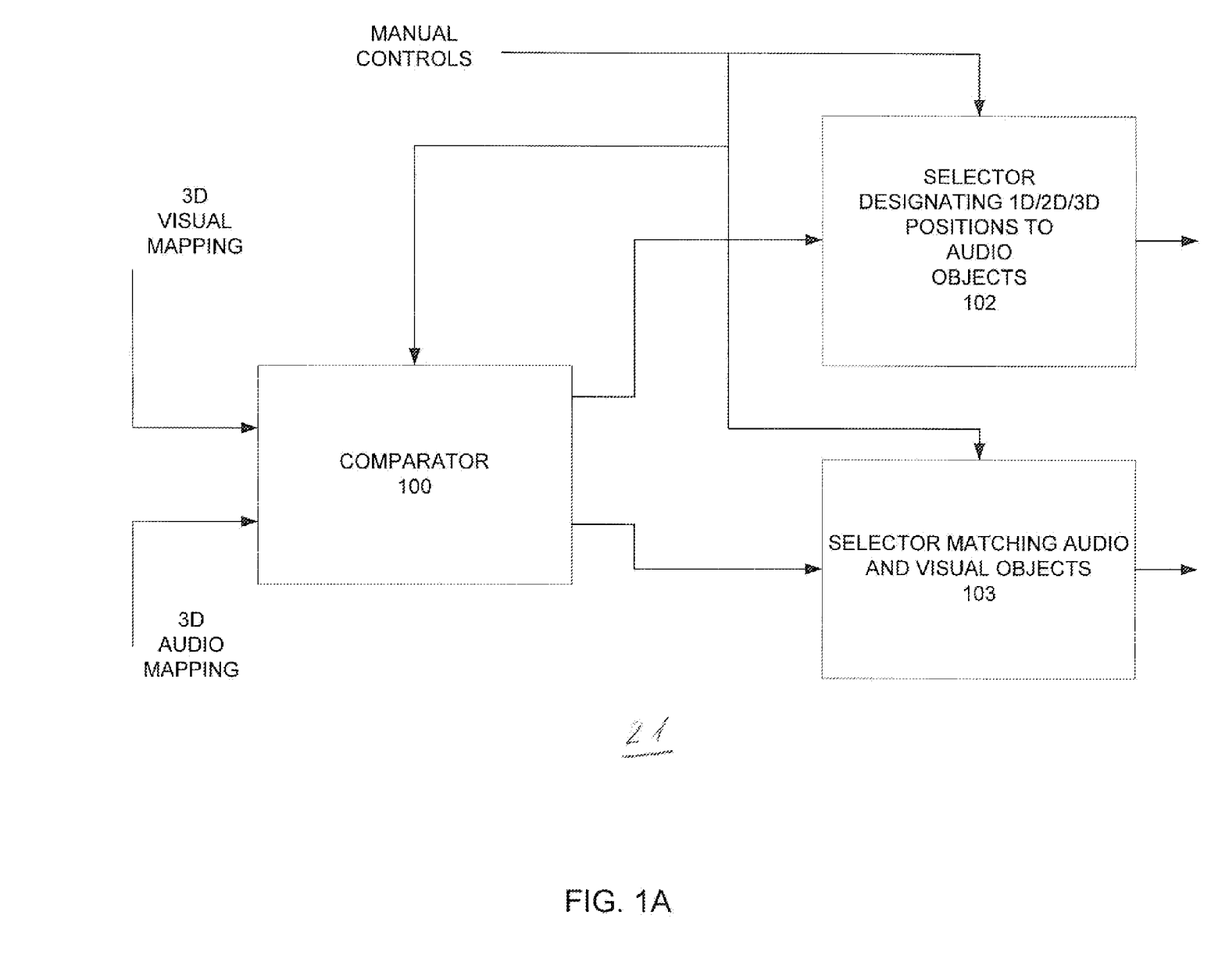
FIG. 1A shows a block diagram of the audio processor.

As shown in more detail in FIG. 1A, audio processor 21 include comparator 100 receiving the 3D video and audio tracking maps. The audio source (i.e., the audio object of interest) can be positioned in 2D and 3D space, i.e. along the X, Y and Z axes. For various editorial, or other reasons, the audio source position in the X, Y and Z axes may be important. Various criteria or approaches can be used to generate and/or identify the positions of audio objects, as discussed in more detail below. Once these positions are selected, then the authoring tool 22 analyzes the audio object parameters, and for each frame or set of frames, allocates the position of the audio object(s) and then generates appropriate authoring or re-authoring control signals for processing the audio source(s) in the 3D frames with cues to position them in the designated location(s).

In some instances, the audio and visual positions of the objects of interest correspond, the 3D space information for both the audio and the visual objects is recorded so that audio objects can be mapped on to the visual objects of interest. In one embodiment of the invention, only the depth positions (e.g., the positions along the Z-axis) are provided. In another embodiment, the positions of the audio objects in 3D volume (e.g., along all three axes X, Y and Z) are provided separately from the position of any visual object.

Referring to FIG. 1A, the comparator 100 receives the audio and visual tracking maps and determines if they are convergent. If there is a single visual object and a single audio present, this determination can be simple. However, if there are multiple visual and multiple audio objects present, manual controls or other means may be used to assign each audio object to each visual object. Once this identification means automated tracking software is provided to track the audio and visual objects consistently by component 103.

In other instances, the audio and visual objects of interest diverge, or no information is available that is indicative of whether an audio object maps to a particular visual object of interest. In this case, either a manual operator, or an automated analyzer running automatic object audio tracking software (if necessary) represented by component 102 can select and track the 'on-screen' audio object(s) of interest (as well as any visual objects A, B, C, or D.) This tracking information may be represented, for example, as a Z-axis depth map (if only depth perception is desired), or it may be represented in full 3D space along the X, Y and Z axes. If there are no audio objects of interest on screen or an audio object is obscured (e.g. an actor speaking from behind a closed door), or if an off screen virtual object has a known or plotted position, then the tracking map is extended to provide information for the occluded or off-screen audio object as well, including an audio object disposed in the same vertical plane as the viewer, or even behind the viewer.

Figure 2:
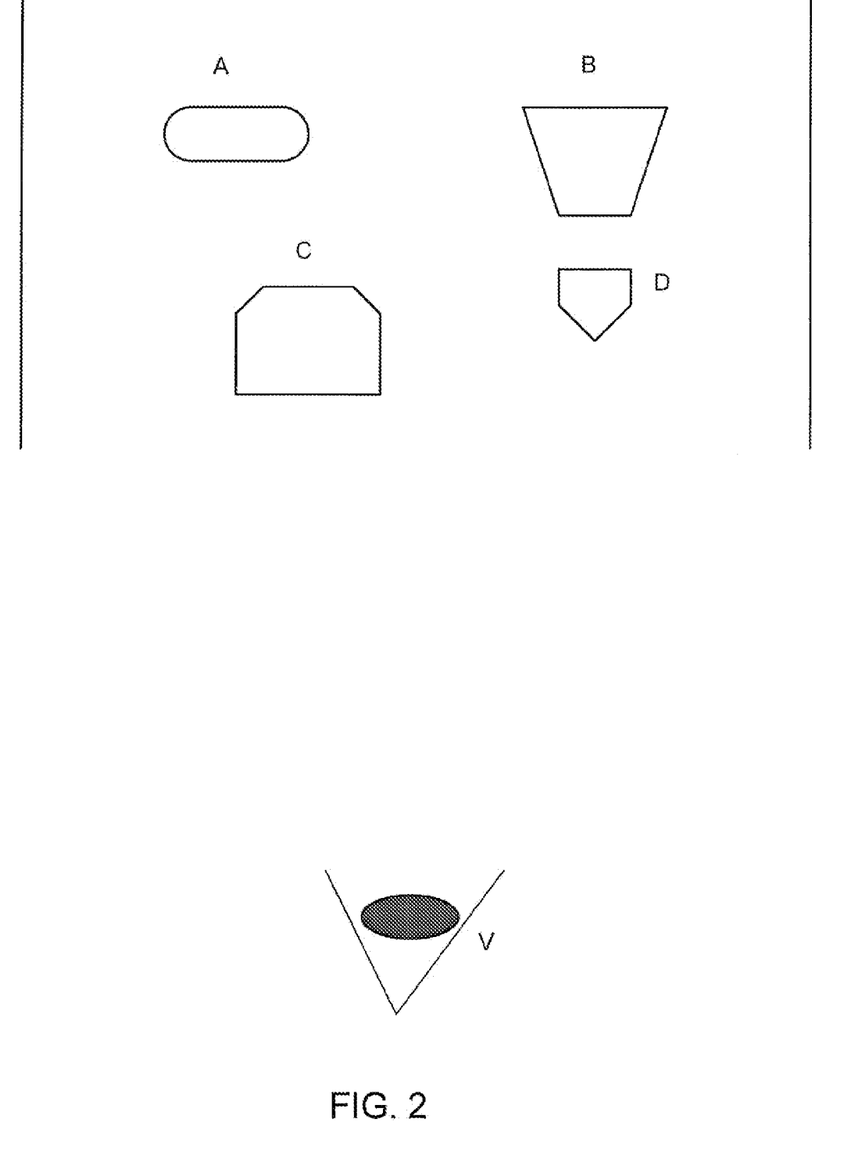
FIGS. 2-4 show several plan views (in the X-Z axis) of several 3D frames with several audio and visual objects of interest.
Figure 3:
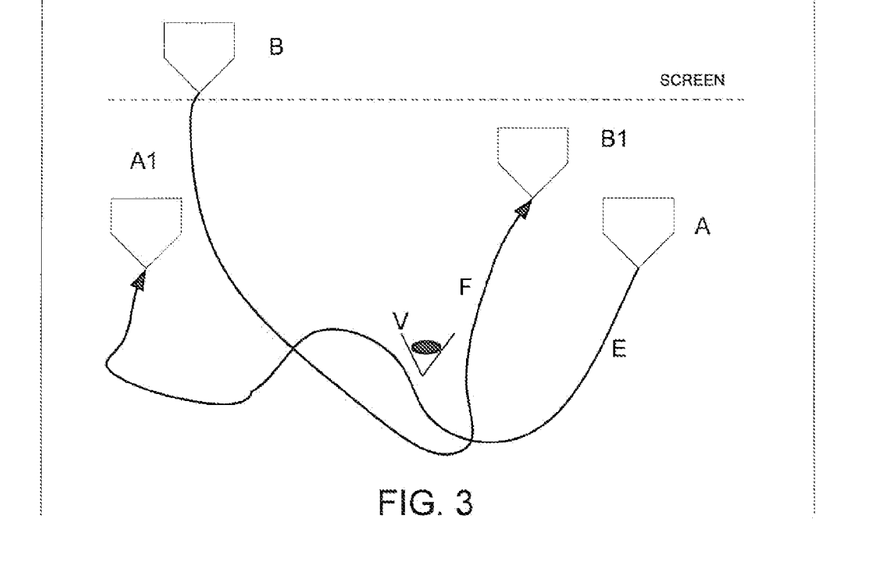
Figure 4:
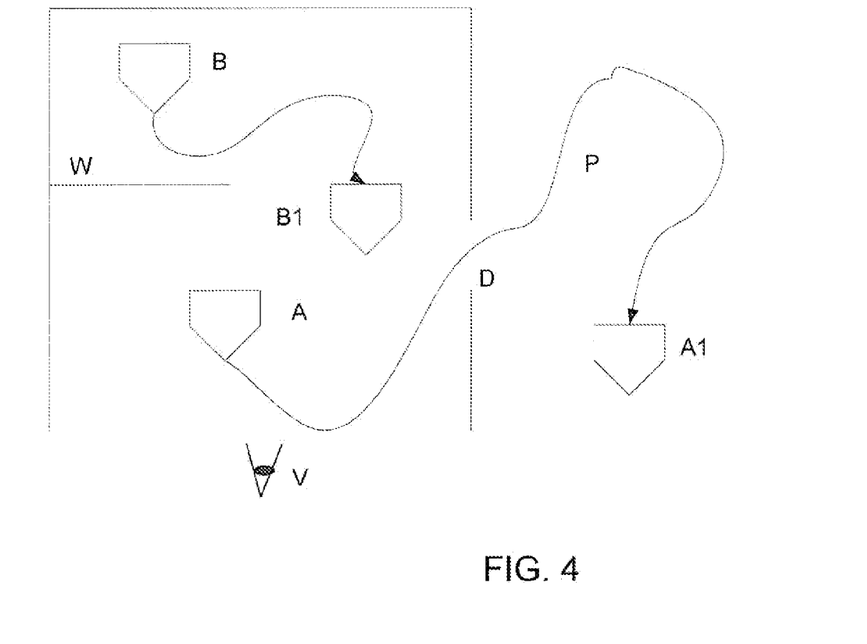

FIGS. 2-4 provide in plan views some simple examples illustrating various audio and visual objects of interest in a scene. FIG. 2 shows a plan view of a stage with four performers A, B, C, D as seen by a viewer V. A, B, C and D may be vocalists and/or musicians and they can remain stationary or move about the stage. Initially, the video component of the received 3D movie shows the positions of each of the performers. The audio component consist of either a mixed audio track, or several tracks with the audio signals from each of the performers, in this case with substantially no audio depth perception or any other audio cues tying the tracks spatially to the performers. In accordance with the present invention, if separate tracks are not available, then the raw audio tracks are analyzed and manipulated by the audio processor (comparator 100 or component 102) to generate audio parameters defining virtual audio tracks representing the sounds from each of the performers. The tracks are then correlated with each of the performers. This can be done either manually by an operator or automatically, for example, by processing the video component to identify the four performers using facial recognition algorithms, by recognizing their instruments, or other means.

Once the positions of the performers are identified or correlated with the respective tracks, audio parameters are generated by the audio processor 21 representing the audio objects of interest. In a preferred embodiment, these parameters represent depth perception cues for some or for all the audio tracks. If desired, the positions of some of the performers are emphasized in some scenes and the positions of other performers can be emphasized at other times, based for example, on the relative loudness of the tracks, or other editorial criteria.

As mentioned above, if the performers move around, their positions are tracked and the audio object positions corresponding to the audio objects of interest are recorded so that the audio tracks corresponding to these objects can be processed with appropriate audio position cues to position them in 3D space.

FIG. 3 shows a plan view of a different scene in which two actors A and B are talking and moving around along paths E and F so that actor A ends up in position A1 and actor B ends up in position B1. At one point, one or both of the actors A and B are positioned 'off stage' behind the viewer V. All the positions are tracked and/or plotted from the video component object tracking map and corresponding audio object tracks are processed with 3D space position cues to correspond to these positions by component 103.

FIG. 4 shows a plan view of a scene somewhat similar to the one in FIG. 3. In this scene, originally, actor B is behind a wall W (or other obstruction) but he can still be heard as he speaks. Actor A is visible, and is talking to B. During the conversation, actor B moves around the wall W and forward toward position B1. Meanwhile, or later, actor A walks through a doorway D so that he is no longer visible, but may move along an arbitrary path P, and still keeps on talking. As the two actors are moving around and talking, their positions are constantly tracked and plotted, so appropriate audio 3D space cues can be generated even if an actor is out of sight, e.g., off stage. (Obviously, FIG. 4 is not to scale since viewer V is normally much further away from the stage.)

Figure 5:
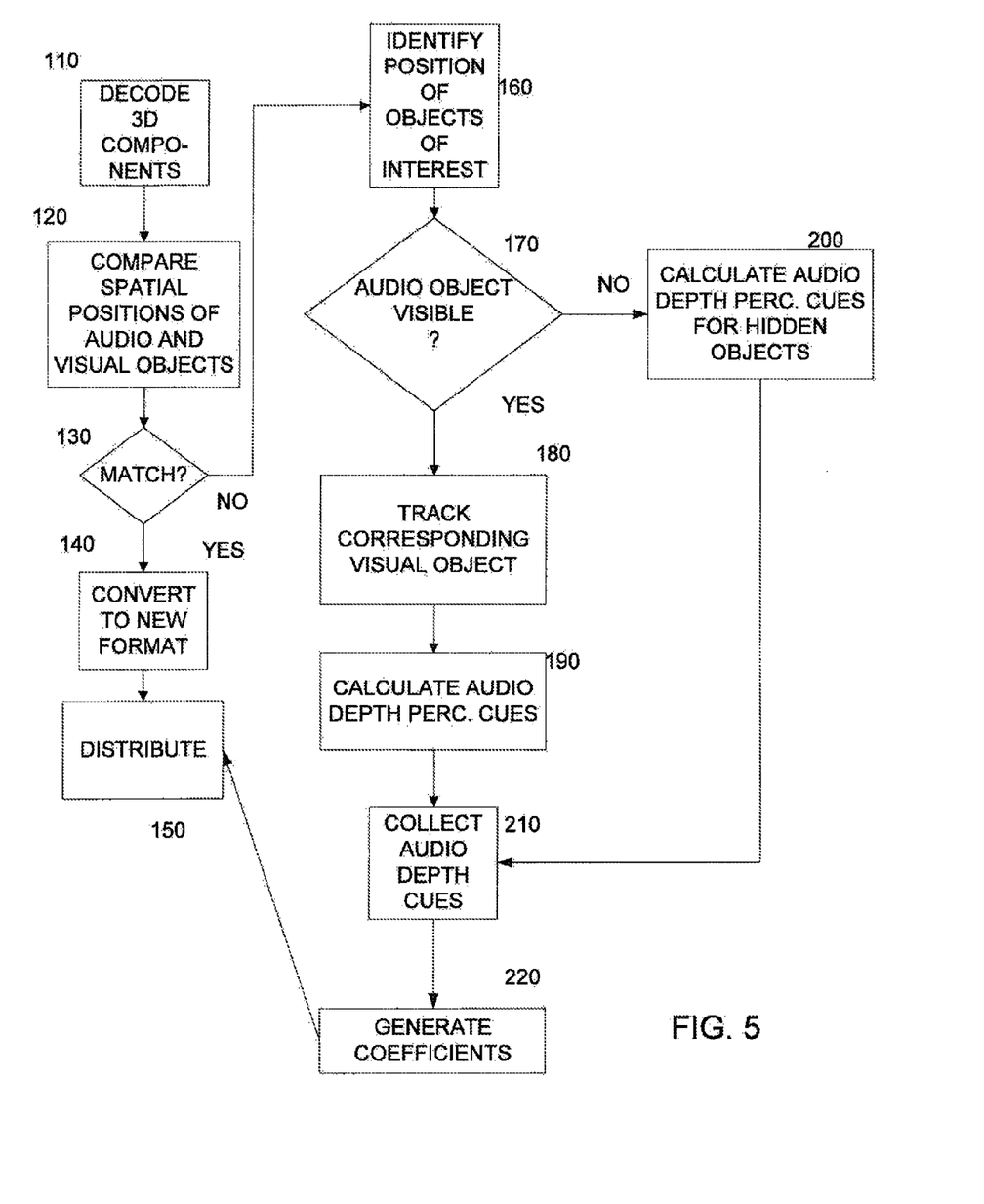
FIG. 5 shows a method of operation of the apparatus of FIG. 1.

FIG. 5 shows a flow chart of an exemplary method used by the apparatus of FIG. 1. As discussed initially, a 3D movie in a known format is received and its audio and video components are encoded in step 110. In step 120 audio and video objects of interest are detected (for example, in a scene). This step can be performed either by an operator or automatically. The spatial positions of these objects are then compared. If they match (step 130) then they are converted into a new format, using an appropriate encoding scheme (step 140) and then distributed (step 150) through an appropriate channel. If there is no match in the spatial positions, or if there is insufficient information to detect the spatial position of an audio object, then in step 160 the spatial positions are identified by audio processor 21.

In step 170, a check is made as to whether an audio object of interest is associated with a visible object. If it is, then in step 180 the positions of the corresponding visual object (actors A, B) are continuously tracked (step 180) and corresponding audio cues are generated (step 190). If an audio object does not correspond to a visual object (for example, actor B in his original position or actor A in position A1) then different calculations are made using specific rules applicable for occluded, off-screen or otherwise hidden objects (step 200). For example, the movement of the hidden object (e.g., an actor moving behind a wall) can be interpolated and used to generate a corresponding audio object. In step 210 the audio and visual parameters are provided to the authoring tool 22. For example, the positional cues (in one, two or three dimensions) can be added to the audio components. Alternatively, a separate field is provided with the audio cues presented as an audio 3D position map, table or other convenient form.

The steps are implemented by the apparatus of FIG. 1 by encoding the audio component with appropriate 3D space audio perception cues. During the initial encoding performed by audio/video encoder 10, various parameters, such as a Z-axis depth map or other indicia for the visual objects of interest, and audio tracks are stored in a log 20. The encoder 10 generates the first 3D encoded content for distribution, storage, recording, etc.

Then, possibly at a future date, content in a different, possibly enhanced, 3D format is desired, which includes 3D audio perception cues. For this purpose, the information from the log 20 is provided to audio processor 21. Alternatively, the first 3D encoded content (or the 3D uncompressed digital master—if still available) is analyzed by analyzer 30 and the resulting 3D tracking map for the visual objects of interest (e.g., a Z-axis depth map) is obtained together with tracking information indicating the positions of audio objects of interest (if available).

The audio processor 21 then uses the information obtained from the log 20 and/or analyzer 30, as well as additional control signals generated manually or automatically and generates a set of audio parameters defining the positions of various audio objects of interest. These audio parameters are provided to the authoring device 22. The authoring device also receives corresponding video information regarding the positions of visual objects or each frame or groups of frames from video processor 23.

The audio parameter are used by the authoring tool 22 to generate parameters (including 3D position perception cues) defining the way audio objects of interest are perceived in may be processed according to one or more audio object tracking map parameters to add cues such as amplitude differences, phase differences, arrival time differences, reverberant vs. direct sound source level ratios, tonal balance shifts, masking, and/or surround or multi-channel directionality. These parameters are tailored for the audio object(s) of interest to correspond, where editorially appropriate, with the visual objects of interest thereby providing an enhanced the 3D audiovisual experience. Operator controls allow for manual override of the otherwise automatic process so that editorial emphasis or de-emphasis of the audio depth perception cues can be managed as appropriate, i.e., when visual and audio objects of interest do not correspond, or when there is no on-screen audio object of interest at all, e.g. an omniscient, disembodied narrator's voice is delivering important dialog as discussed above.

In the example given above, the various scenes are described as real scenes shot of real actors speaking real dialog. Of course, these scenes need not be based real action and characters but could be either hybrid real and virtual actions and characters, or purely virtual ones. The term 'virtual actions or characters' is used to describe cartoon characters or other virtual objects or action (both visual and audio) generated animation or by a video game or other similar rendering device.

The authoring tool 22 generates a set of encoder coefficients corresponding to the audio and visual objects for each frame or group of frames.

In one embodiment of the invention, a second audio/video encoder 70 may, but need not, be similar or even identical to encoder 10 as shown in FIG. 1 to receive digital content based on the 3D uncompressed video master 60 in any format including any one of the formats described above. The encoder 70 analyzes the received digital 3D movie and determines its format automatically, or the device can receive user input or some other signal indicative of the format for the received digital 3D content. The encoder 70 also receives information specifying a desired output format, or is preprogrammed to convert the digital 3D content into a corresponding second encoded 3D content in a preselected different format (such as Blu-ray Disc, satellite broadcast, Nintendo 3DS, etc.) The encoder 70 uses a plurality of encoding coefficients stored in a memory 70B for this purpose. Some of the encoding coefficients may be common to several different output formats while others will be unique to each format. Importantly, in accordance with this invention, the content of memory 70B is altered by changing one or more of the predetermined coefficients with the parameters from the authoring tool 22. In some cases, the parameters from the tool 22 may not be compatible with the encoder 70. In this case, the parameters from the tool 22 are first provided to a mapping processing element 24 that maps the parameters into a format that is compatible with encoder 70. The mapped parameters replace some or all of the coefficients in memory 70B.

It should be emphasized that in the above description, the cues for audio depth perception are discussed primarily as being indicative of the 3D position of an audio object of interest, in at least one, or two or all three dimensions, i.e., X, Y and Z.

In one embodiment, the authoring tool 70 not only modifies the audio signals with depth perception cues; it also creates meta data that contains the relevant inverse transforms so that a down-stream signal processor (not shown) can derive the original (or close to the original if the process is lossy), un-optimized digital 3D movie audio stream for 2D viewing. The metadata is stored along with the second encoded 3D content.

In one embodiment of the invention, the format of the second encoded 3D content is very different then the format of the first encoded 3D content, for example in terms of the intended environment. For example, the first encoded 3D content may be formatted for a digital 3D movie distribution channel intended for a 70 ft. theatrical exhibition, while the second encoded 3D content is directed at a Nintendo 3DS 3.5 inch handheld screen. The authoring tool settings are selected accordingly, to conform to different digital 3D movie distribution channels or formats for other systematic reasons. (Details of such a transformation are described in commonly assigned pending provisional application Ser. No. 61/533,777 filed: Sep. 12, 2011 entitled METHODS FOR CONTROLLING SCENE, CAMERA AND VIEWING PARAMETERS FOR ALTERING PERCEPTION OF 3D IMAGERY; and Ser. No. 61/491,157,
Filed: May 28, 2011, entitled METHODS FOR CONTROLLING SCENE, CAMERA AND VIEWING PARAMETERS FOR ALTERING PERCEPTION OF 3D IMAGERY.

Importantly, the positions of the audio objects of interest must be adjusted accordingly.

One skilled in the art will appreciate the fact that while in the embodiment shown in FIG. 1 the second audio/visual encoder 70 receives either the original uncompressed video master or the first 3D encoded content as an input, the invention is not so limited and in fact, the encoder 70 receive any other content as an input and cooperate with appropriate components from FIG. 1 (e.g., analyzer 30, audio and visual processors 21 and 23 and authoring tool 22) to generate a corresponding 3D encoded output having incorporated therein information (either in the form of audio objects, or as cues) indicative of positional information of one or more sounds specific to one or more frames. As described above, this information may be coupled or tied to, or it could be completely independent of the positions of any visual objects of interest.

The present system and method provide for a means of providing an enhanced encoded 3D content efficiently through dynamic processing by identifying or generating audio objects of interest, using information from log 20 or analyzer 30.

Numerous modifications may be made to this invention without departing from its scope as defined in the appended claims.

We claim:

1. An apparatus for generating a 3D movie with an audio object and a visual object comprising:
   an authoring tool receiving audio information related to the spatial position of said audio object within a plurality of 3D frames, said authoring tool generating an audio spatial parameter identifying said audio spatial position;
   an encoder receiving 3D content including audio and visual tracks, and said audio spatial parameter and generating an encoded 3D content including said audio object, the spatial position of said audio object being identified by audio positioning cues based on said audio spatial parameter; and
   an audio processor receiving an audio track and a position signal identifying the spatial position of said audio track and wherein said audio processor is adapted to generate an audio object parameter for said authoring tool, wherein said authoring tool generates said audio spatial parameter based on said audio object parameter;
   wherein said audio processor receives visual information related to the spatial position of said visual object and generates said audio object parameter based on said visual information to place said audio object at a predetermined position with respect to said visual object;
   wherein said audio processor generates said audio parameter to place said audio object in front of said visual object.

2. An apparatus for generating a 3D movie with an audio object and a visual object comprising:
   an authoring tool receiving audio information related to the spatial position of said audio object within a plurality of 3D frames, said authoring tool generating an audio spatial parameter identifying said audio spatial position;
   an encoder receiving 3D content including audio and visual tracks, and said audio spatial parameter and generating an encoded 3D content including said audio object, the spatial position of said audio object being identified by audio positioning cues based on said audio spatial parameter; and
   an audio processor receiving an audio track and a position signal identifying the spatial position of said audio track and wherein said audio processor is adapted to generate an audio object parameter for said authoring tool, wherein said authoring tool generates said audio spatial parameter based on said audio object parameter;

wherein said audio processor receives visual information related to the spatial position of said visual object and generates said audio object parameter based on said visual information to place said audio object at a predetermined position with respect to said visual object;

wherein said audio processor generates said audio parameter to place said audio object behind of said visual object.

3. The apparatus of claim 1 wherein said encoder generates said encoded 3D content based on at least one encoding coefficient, said encoding coefficient being related to said audio spatial parameter.

4. The apparatus of claim 1 wherein said encoder generates said encoded 3D content based on at least a first encoding coefficient dependent on said audio spatial parameter and a second encoding coefficient that is independent of said audio spatial parameter.

5. The apparatus of claim 1 wherein said authoring tool receives visual information related to the spatial position of said visual object of interest.

6. The apparatus of claim 4 wherein said authoring tool generates said audio spatial parameter in accordance with said visual information.

7. An apparatus for generating a 3D movie with an audio object and a visual object comprising:
an authoring tool receiving audio information related to the spatial position of said audio object within a plurality of 3D frames, said authoring tool generating an audio spatial parameter identifying said audio spatial position;
an encoder receiving 3D content including audio and visual tracks, and said audio spatial parameter and generating an encoded 3D content including said audio object, the spatial position of said audio object being identified by audio positioning cues based on said audio spatial parameter; and
an audio processor receiving an audio track and a position signal identifying the spatial position of said audio track and wherein said audio processor is adapted to generate an audio object parameter for said authoring tool, wherein said authoring tool generates said audio spatial parameter based on said audio object parameter;
wherein said audio processor receives visual information related to the spatial position of said visual object and generates said audio object parameter based on said visual information to place said audio object at a predetermined position with respect to said visual object;
wherein said audio processor receives external control signals indicating a path of movement of said audio object and generates said audio object parameter to reflect said path.

8. The apparatus of claim 1 wherein said authoring tool generates said audio spatial parameter designating a position in one of one, two and three dimensions.

9. The apparatus of claim 1 further comprising an initial encoder receiving a 3D movie and encoding said 3D movie, said initial encoder generating visual parameters related to a one of a Z-axis depth map, a 3D space map and a 3D depth map indicating at least a position of a visual object of interest, and wherein said authoring tool generates said audio spatial parameter based on said visual parameters.

10. The apparatus of claim 9 further comprising an analyzer receiving a 3D movie and analyzing said 3D movie to generate said visual parameters.

11. The apparatus of claim 1 wherein said 3D movie includes several scenes and said authoring tool selects said audio spatial parameter for each scene, said audio spatial parameter being indicative of the position of said audio object of interest for each scene.

12. A method for generating an encoded 3D movie comprising:
receiving 3D content having several scenes and including audio and visual tracks;
determining the location of an audio object and a visual object in a first dimension in each scene;
generating an audio spatial parameter indicating the position of said audio object in each scene, said audio object being associated with a respective sound track;
encoding said 3D content using encoding coefficients at least in part dependent on said audio spatial parameter to generate an encoded 3D movie, said encoded 3D movie including visual components and audio components, the audio components being derived from said sound track, said encoded 3D movie including audio cues indicative of the position of an audio object in said one dimension;
setting said audio cues to set the position of said audio object at a predetermined distance with respect to said video object.

13. The method of claim 12 wherein said step of determining includes determining the position of said audio object at least one of an X-, Y- and Z-dimension.

14. The method of claim 13 wherein said location of said visual object is determined along at least one of an X-, Y- and Z-dimension.

15. An apparatus for generating a 3D movie with an audio object and a visual object comprising:
an authoring tool receiving audio information related to the spatial position of an audio object of interest within a plurality of 3D frames, said authoring tool generating an audio spatial parameter identifying said spatial position;
an encoder receiving 3D content including audio and visual tracks, and said audio spatial parameter and generating an encoded 3D content including said audio object, the spatial position of said audio object being identified by audio positioning cues based on said audio spatial parameter; and
an audio processor receiving an audio track and a position signal identifying the spatial position of said audio track and wherein said audio processor is adapted to generate an audio object parameter for said authoring tool, wherein said authoring tool generates said audio spatial parameter based on said audio object parameter;
wherein said audio processor receives visual information related to the spatial position of said visual object and generates an audio object parameter based on said visual information; and
wherein said audio processor selects the positions of audio object to place the one audio objects at a predetermined position with respect to the visual objects.

* * * * *